(12) United States Patent
Gao et al.

(10) Patent No.: US 10,560,902 B2
(45) Date of Patent: Feb. 11, 2020

(54) METHOD, DEVICE AND APPARATUS FOR CONTROLLING UPLINK TRANSMISSION POWER, AND STORAGE MEDIUM

(71) Applicant: CHINA ACADEMY OF TELECOMMUNICATIONS TECHNOLOGY, Beijing (CN)

(72) Inventors: Xuejuan Gao, Beijing (CN); Songtao Liu, Beijing (CN); Xueming Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/316,882

(22) PCT Filed: Jul. 6, 2017

(86) PCT No.: PCT/CN2017/091936
§ 371 (c)(1),
(2) Date: Jan. 10, 2019

(87) PCT Pub. No.: WO2018/010589
PCT Pub. Date: Jan. 18, 2018

(65) Prior Publication Data
US 2019/0230600 A1    Jul. 25, 2019

(30) Foreign Application Priority Data
Jul. 11, 2016 (CN) .......................... 2016 1 0543468

(51) Int. Cl.
*H04W 52/14*      (2009.01)
*H04W 52/34*      (2009.01)
(Continued)

(52) U.S. Cl.
CPC ......... *H04W 52/146* (2013.01); *H04L 5/0055* (2013.01); *H04W 52/242* (2013.01); *H04W 52/34* (2013.01); *H04W 72/0446* (2013.01)

(58) Field of Classification Search
CPC .............. H04L 5/0055; H04W 52/146; H04W 52/242; H04W 72/0446
See application file for complete search history.

(56) References Cited

U.S. PATENT DOCUMENTS

| 2009/0245190 A1 * | 10/2009 | Higuchi .................. H04L 47/10 370/329 |
| 2014/0341155 A1 | 11/2014 | He |

(Continued)

FOREIGN PATENT DOCUMENTS

| CN | 101860947 A | 10/2010 |
| CN | 102469567 A | 5/2012 |

(Continued)

OTHER PUBLICATIONS

Chinese Office Action dated Dec. 12, 2018 for CN Application No. 201610543468.4 (with English translation).

(Continued)

*Primary Examiner* — David Bilodeau
(74) *Attorney, Agent, or Firm* — Harness, Dickey and Pierce, P.L.C.

(57) ABSTRACT

The present disclosure provides a method, a device and an apparatus for controlling uplink transmission power, and a storage medium. The method includes: receiving, by a UE, configuration information, and determining a PC parameter corresponding to a TTI length of a first type and a PC parameter corresponding to a TTI length of a second type in accordance with the configuration information; and determining, by the UE, transmission power of a channel which is transmitted using the TTI length of the first type in accordance with the PC parameter corresponding to the TTI (Continued)

receiving, by a UE, configuration information, and determining a PC parameter corresponding to a TTI length of a first type and a PC parameter corresponding to a TTI length of a second type in accordance with the configuration information — 201 determining, by the UE, transmission power of channel which is transmitted using the TTI length of the first type according to the PC parameter corresponding to the TTI length of the first type, and transmission power of channel which is transmitted using the TTI length of the second type according to the PC parameter corresponding to the TTI length of the second type — 202 length of the first type, and transmission power of a channel which is transmitted using the TTI length of the second type in accordance with the PC parameter corresponding to the TTI length of the second type.

12 Claims, 2 Drawing Sheets

(51) Int. Cl.
*H04W 72/04* (2009.01)
*H04L 5/00* (2006.01)
*H04W 52/24* (2009.01)

(56) References Cited

U.S. PATENT DOCUMENTS

| 2015/0341866 | A1 | 11/2015 | Park et al. |
| 2016/0150490 | A1 | 5/2016 | Ouchi et al. |
| 2016/0234787 | A1* | 8/2016 | Liu .................... H04W 52/367 |
| 2017/0238305 | A1* | 8/2017 | Chen ................. H04W 72/0413 370/311 |
| 2019/0150176 | A1* | 5/2019 | Pelletier ............ H04W 72/1247 370/329 |

FOREIGN PATENT DOCUMENTS

| CN | 103228036 A | 7/2013 |
| CN | 103369556 A | 10/2013 |
| CN | 104247313 A | 12/2014 |
| CN | 104812044 A | 7/2015 |
| EP | 1143634 A1 | 10/2001 |
| JP | WO2014181618 A1 | 2/2017 |
| KR | 20150105329 A | 9/2015 |
| WO | WO-2014/166122 A1 | 10/2014 |

OTHER PUBLICATIONS

"Simultaneous Transmissions of UL Signals for Shortened TTI Operation", R1-164923, 3GPP TSG RAN WG1 Meeting #85, Nanjing P.R. China, May 27, 2016.
European Search Report dated Jul. 5, 2019 for EP Application No. 17 82 6926.2.
"System-level simulation results for TDD scenario with latency reduction", 3GPP Draft; R1-165430 TDD for LR, 3rd Generation Partnership Project (3GPP), Mobile Competence Centre; 650, Route Des Lucioles; F-06921 Sophia-Antipolis Cedex; France, vol. RAN WG1, No. Nanjing, Chine May 23, 2016-May 27, 2016, May 20, 2016, XP051111626.
International Search Report PCT/ISA/210 for International Application No. PCT/CN2017/091936 dated Sep. 12, 2017.
Written Opinion of the International Searching Authority PCT/ISA/237 for International Application No. PCT/CN2017/091936 dated Sep. 12, 2017.
"Channel Design for shortened TTI in FDD", 3GPP TSG RAN WG1 Meeting #84bis, R1-162945, MediaTek Inc., Agenda Item 7.3.10.2, Apr. 11-15, 2016, Busan, Korea.
Japanese Office Action dated Nov. 11, 2019 for Japanese Application No. 2019-500880.
Korean Office Action dated Nov. 28, 2019 for Korean Application No. 10-2019-7003225.
Ericsson, R1-160941, "DCI bit fields for short TTI uplink transmissions", 3GPP TSG RAN WG1 Meeting #84, Agenda Item 7.3.4.3, Malta, Feb. 15-19, 2016.

* cited by examiner

FIG. 1 receiving, by a UE, configuration information, and determining a PC parameter corresponding to a TTI length of a first type and a PC parameter corresponding to a TTI length of a second type in accordance with the configuration information — 201 determining, by the UE, transmission power of channel which is transmitted using the TTI length of the first type according to the PC parameter corresponding to the TTI length of the first type, and transmission power of channel which is transmitted using the TTI length of the second type according to the PC parameter corresponding to the TTI length of the second type — 202

METHOD, DEVICE AND APPARATUS FOR CONTROLLING UPLINK TRANSMISSION POWER, AND STORAGE MEDIUM

CROSS-REFERENCE TO RELATED APPLICATIONS

The present application is the U.S. national phase of PCT Application No. PCT/CN2017/091936 filed on Jul. 6, 2017, which claims a priority of the Chinese patent application 201610543468.4 filed on Jul. 11, 2016, which are incorporated herein by reference in their entirety.

TECHNICAL FIELD

The present disclosure relates to the field of communication technology, in particular to a method, a device and an apparatus for controlling uplink transmission power, and a storage medium.

BACKGROUND

Figure 1:
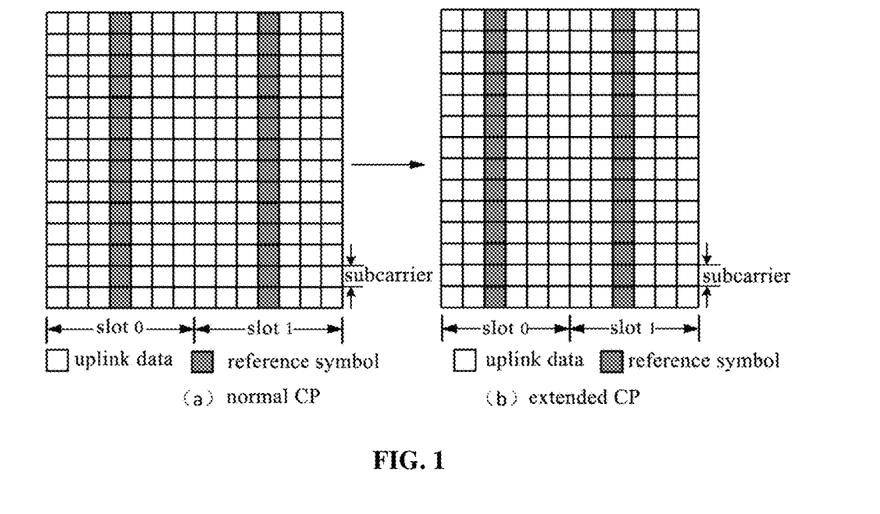
FIG. 1 is a schematic view showing structures of pilot signals for a conventional PUSCH.

FIG. 1 shows structures of data and pilot signals (i.e., reference symbols or Demodulation Reference Signals (DMRSs) for data demodulation) within a subframe for a Long Term Evolution (LTE) Physical Uplink Shared Control Channel (PUSCH). In the case of a normal Cyclic Prefix (CP), a $4^{th}$ symbol in each time slot within each subframe is adopted for transmitting the pilot signals, and the other symbols are adopted for transmitting the data. In the case of an extended CP, a $3^{rd}$ symbol in each time slot within each subframe is adopted for transmitting the pilot signals, and the other symbols are adopted for transmitting the data. An uplink pilot signal is a User Equipment (UE)-specific pilot signal, and it is generated in accordance with an actual bandwidth scheduled by the PUSCH. Transmission power of the DMRS is the same as transmission power of the data. In order to support uplink Multi-User Multiple-Input Multiple-Output (MU-MIMO), a same basic pilot signal may be cyclically shifted, so as to transmit the pilot signals in an orthogonal manner for a plurality of UEs sharing a same resource, so that a receiving end may differentiate pilot information for different UEs through cyclic shift.

For uplink power control in a conventional LTE system, the uplink power control is mainly adopted for the compensation of path loss and shadow of a channel, and for the suppression of inter-cell interference. Transmission power of the UE may be calculated in accordance with a slow power control instruction from an evolved Node B (eNB) and a path loss value measured through a downlink Reference Signal (RS). The transmission power for the PUSCH is calculated through the following formula:

$$P_{PUSCH}(i) = \min\begin{Bmatrix} P_{MAX}(i), \\ 10\log_{10}(M_{PUSCH}(i)) + P_{O\_PUSCH}(j) + \\ \alpha(j) \cdot PL + \Delta_{TF}(i) + f(i) \end{Bmatrix} [dBm],$$

where $P_{PUSCH}(i)$ represents the transmission power of the UE, $P_{MAX}$ represents maximum transmission power of the UE, $M_{PUSCH}(i)$ represents a quantity of uplink Resource Blocks (RBs) allocated for the UE, $P_{O\_PUSCH}(j)$ is a sum of a cell-specific normalized portion $P_{O\_NOMINAL\_PUSCH}$ and a UE-specific portion $P_{O\_UE\_PUSCH}(j)$, $\alpha$ represents a cell-specific path loss compensation coefficient, PL represents a downlink path loss estimated at a UE layer, $\Delta_{TF}(i)=10$ $\log_{10}((2^{BPRE \cdot K_S} - 1) \cdot \beta_{offset}^{PUSCH})$, $K_S$ represents a cell-specific parameter configured through Radio Resource Control (RRC) and corresponding to a current transmission format, f(i) represents an adjustment value for current power control and $f(i)=f(i-1)+\delta_{PUSCH}(i-K_{PUSCH})$ $\delta_{PUSCH}$ represents a UE-specific modified value and it is also called as Transmission Power Control (TPC).

The transmission power for a Physical Uplink Control Channel (PUCCH) is calculated through the following formula:

$$P_{PUCCH}(i) = \min\begin{Bmatrix} P_{MAX}(i), \\ P_{0\_PUCCH} + PL + h(n_{CQI}, n_{HARQ}, n_{SR}) + \\ \Delta_{F\_PUCCH}(F) + \Delta_{TxD}(F') + g(i) \end{Bmatrix}[dBm],$$

where $P_{PUCCH}(i)$ represents the transmission power of the UE, $P_{MAX}$ represents maximum transmission power of the UE, PL represents a downlink path loss estimated at a UE layer and it is indicated in UE-measured downlink resource grant information, $h(n_{CQI}, n_{HARQ}, n_{SR})$ represents a quantity of bits in Channel Quality Indicator (CQI) information, a quantity of bits in a Hybrid Automatic Repeat Request (HARQ) information and an independent parameter corresponding to a Scheduling Request (SR) configuration in a transmission frame format, $\Delta_{F\_PUCCH}$ (F) is notified by a high layer and corresponds to a cell-specific parameter and a transmission format of the PUCCH, $\Delta_{TxD}(F')$ is notified by the high layer and associated with a UE-specific parameter and a quantity of transmission antennae, $g(i)=g(i-1)+\delta_{PUCCH}(i-K_{PUCCH})$ for a Frequency Division Duplex (FDD) system or $$g(i) = g(i-1) + \sum_{m=0}^{M-1} \delta_{PUCCH}(i - k_m)$$

for a Time Division Duplex (TDD) system, g(i) represents a modulated value for current PUCCH power control, $\delta_{PUCCH}$ represents a UE-specific modified value, M represents a value corresponding to a TDD frame structure, and $K_{PUCCH}$ corresponds to a system predefined parameter and a TDD uplink/downlink configuration.

In the LTE system, conventional channel transmission is defined in subframes. When a Transmission Time Interval (TTI) length shorter than 1 ms is adopted for the transmission, in order to reduce a DMRS overhead within a short TTI (sTTI), for the transmission within a plurality of sTTIs of one time slot (i.e., the data transmission having a length in a time domain shorter than 1 ms), the DRMSs may be transmitted at a same time-domain position. Hence, a density of the DMRSs within each sTTI is smaller than a density of the DMRSs within each normal TTI. At this time, the normal TTI is different from the sTTI in terms of the channel estimation performance, and thereby the transmission performance may be adversely affected. Through separate configuration of the power control parameter with respect to different TTI lengths, it is able to reduce the difference in the transmission performance. However, there is currently no definite method for separately configuring the power control parameter.

SUMMARY

An object of the present disclosure is to provide a method and a device for controlling uplink transmission power, so as to separately configure the power control parameter with respect to different TTI lengths.

In one aspect, the present disclosure provides in some embodiments a method for controlling uplink transmission power, including: receiving, by a UE, configuration information, and determining a power control (PC) parameter corresponding to a TTI length of a first type and a PC parameter corresponding to a TTI length of a second type in accordance with the configuration information; and determining, by the UE, transmission power of a channel which is transmitted using the TTI length of the first type in accordance with the PC parameter corresponding to the TTI length of the first type, and transmission power of a channel which is transmitted using the TTI length of the second type in accordance with the PC parameter corresponding to the TTI length of the second type.

In some possible embodiments of the present disclosure, the TTI length of the first type is a TTI length of one subframe, and the TTI length of the second type is a TTI length shorter than the TTI length of one subframe; or the TTI length of the first type is a short TTI length, and the TTI length of the second type is a normal TTI length; or the TTI length of the first type is a short TTI length of a first type, and the TTI length of the second type is a short TTI length of a second type.

In some possible embodiments of the present disclosure, the receiving, by the UE, the configuration information, and determining the PC parameter corresponding to the TTI length of the first type and the PC parameter corresponding to the TTI length of the second type in accordance with the configuration information includes receiving, by the UE, RRC signaling or broadcast signaling, acquiring at least one of a path loss compensation factor and a first power offset value corresponding to the TTI length of the first type, and acquiring at least one of a path loss compensation factor and a second power offset value corresponding to the TTI length of the second type.

In some possible embodiments of the present disclosure, a TPC accumulation mode is enabled for a PUSCH. The receiving, by the UE, the configuration information, and determining the PC parameter corresponding to the TTI length of the first type and the PC parameter corresponding to the TTI length of the second type in accordance with the configuration information includes: receiving, by the UE, a downlink control channel with an uplink Downlink Control information (DCI) format for scheduling the PUSCH, and when a TTI length for the PUSCH scheduled by the downlink control channel is the TTI length of the first type, taking, by the UE, a sum of a power adjustment value indicated by a TPC field in the downlink control channel and a power adjustment value corresponding to a previous PUSCH which is transmitted using the TTI length of the first type as a power adjustment value for the PUSCH; and when the TTI length for the PUSCH scheduled by the downlink control channel is the TTI length of the second type, taking, by the UE, a sum of the power adjustment value indicated by the TPC field in the downlink control channel and a power adjustment value corresponding to a previous PUSCH which is transmitted using the TTI length of the second type as the power adjustment value for the PUSCH.

In some possible embodiments of the present disclosure, the receiving, by the UE, the configuration information, and determining the PC parameter corresponding to the TTI length of the first type and the PC parameter corresponding to the TTI length of the second type in accordance with the configuration information includes: receiving, by the UE, a downlink control channel with a downlink DCI format for scheduling a Physical Downlink Shared Channel (PDSCH) or a downlink control channel indicating downlink Semi-Persistent Scheduling (SPS) resource release, Acknowledgement/Non-Acknowledgement (ACK/NACK) feedback information of the PDSCH or the downlink control channel indicating the downlink SPS resource release being transmitted in a target PUCCH; when a TTI length for the PDSCH or the downlink control channel indicating the downlink SPS resource release is the TTI length of the first type, taking a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using TTI length of the first type or a downlink control channel indicating the downlink SPS resource release transmitted using TTI length of the first type, as the power adjustment value for the PUCCH; and when the TTI length for the PDSCH or the downlink control channel indicating the downlink SPS resource release is the TTI length of the second type, taking a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using TTI length of the second type or a downlink control channel indicating the downlink SPS resource release transmitted using TTI length of the second type, as the power adjustment value for the PUSCH.

In some possible embodiments of the present disclosure, the receiving, by the UE, the configuration information, and determining the PC parameter corresponding to the TTI length of the first type and the PC parameter corresponding to the TTI length of the second type in accordance with the configuration information includes: receiving, by the UE, a downlink control channel with a downlink DCI format for scheduling a PDSCH or a downlink control channel indicating downlink SPS resource release, the PDSCH or the downlink control channel indicating the downlink SPS resource release performing ACK/NACK feedback in a target PUCCH; when a TTI length for the PUCCH is the TTI length of the first type, taking a sum of a power adjustment value indicated by a TPC field in the downlink control channel and a power adjustment value corresponding to a previous PUCCH which is transmitted using the TTI length of the first type as a power adjustment value for the PUCCH; and when the TTI length for the PUCCH is the TTI length of the second type, taking a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the second type as the power adjustment value for the PUSCH.

In some possible embodiments of the present disclosure, the TTI length for the PUCCH is notified in the downlink control channel, or through configuration signaling, or in accordance with a pre-agreed rule.

In some possible embodiments of the present disclosure, for the PUCCH, the TPC field is a TPC field in one of the downlink control channel with the downlink DCI format for scheduling the PDSCH and the downlink control channel indicating the downlink SPS resource release except the downlink control channel in which the TPC field is reused for indicating an ACK/NACK resource.

In another aspect, the present disclosure provides in some embodiments a device for controlling uplink transmission power, including: a reception module configured to receive configuration information, and determine a PC parameter corresponding to a TTI length of a first type and a PC parameter corresponding to a TTI length of a second type in accordance with the configuration information; and a control module configured to determine transmission power of a channel which is transmitted using the TTI length of the first type in accordance with the PC parameter corresponding to the TTI length of the first type, and determine transmission power of a channel which is transmitted using the TTI length of the second type in accordance with the PC parameter corresponding to the TTI length of the second type.

In some possible embodiments of the present disclosure, the TTI length of the first type is a TTI length of one subframe, and the TTI length of the second type is a TTI length shorter than the TTI length of one subframe; or the TTI length of the first type is a short TTI length, and the TTI length of the second type is a normal TTI length; or the TTI length of the first type is a short TTI length of a first type, and the TTI length of the second type is a short TTI length of a second type.

In some possible embodiments of the present disclosure, the reception module is further configured to receive RRC signaling or broadcast signaling, acquire at least one of a path loss compensation factor and a first power offset value corresponding to the TTI length of the first type, and acquire at least one of a path loss compensation factor and a second power offset value corresponding to the TTI length of the second type.

In some possible embodiments of the present disclosure, a TPC accumulation mode is enabled for a PUSCH. The control module is further configured to: receive a downlink control channel with an uplink DCI format for scheduling the PUSCH, and when a TTI length for the PUSCH scheduled by the downlink control channel is the TTI length of the first type, take a sum of a power adjustment value indicated by a TPC field in the downlink control channel and a power adjustment value corresponding to a previous PUSCH which is transmitted using the TTI length of the first type as a power adjustment value for the PUSCH; and when the TTI length for the PUSCH scheduled by the downlink control channel is the TTI length of the second type, take a sum of the power adjustment value indicated by the TPC field in the downlink control channel and a power adjustment value corresponding to a previous PUSCH which is transmitted using the TTI length of the second type as the power adjustment value for the PUSCH.

In some possible embodiments of the present disclosure, the control module is further configured to: receive a downlink control channel with a downlink DCI format for scheduling a PDSCH or a downlink control channel indicating downlink SPS resource release, ACK/NACK feedback information of the PDSCH or the downlink control channel indicating the downlink SPS resource release being transmitted in a target PUCCH; when a TTI length for the PDSCH or the downlink control channel indicating the downlink SPS resource release is the TTI length of the first type, take a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using TTI length of the first type or a downlink control channel indicating the downlink SPS resource release transmitted using TTI length of the first type, as the power adjustment value for the PUCCH; and when the TTI length for the PDSCH or the downlink control channel indicating the downlink SPS resource release is the TTI length of the second type, take a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using TTI length of the second type or a downlink control channel indicating the downlink SPS resource release transmitted using TTI length of the second type, as the power adjustment value for the PUCCH.

In some possible embodiments of the present disclosure, the control module is further configured to: receive a downlink control channel with a downlink DCI format for scheduling a PDSCH or a downlink control channel indicating downlink SPS resource release, the PDSCH or the downlink control channel indicating the downlink SPS resource release performing ACK/NACK feedback in a target PUCCH; when a TTI length for the PUCCH is the TTI length of the first type, take a sum of a power adjustment value indicated by a TPC field in the downlink control channel with the downlink DCI format for scheduling the PDSCH or the downlink control channel indicating the downlink SPS resource release and a power adjustment value corresponding to a previous PUCCH which is transmitted using the TTI length of the first type as a power adjustment value for the PUCCH; and when the TTI length for the PUCCH is the TTI length of the second type, take a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the second type as the power adjustment value for the PUSCH.

In some possible embodiments of the present disclosure, the TTI length for the PUCCH is notified in the downlink control channel, or through configuration signaling, or in accordance with a pre-agreed rule.

In some possible embodiments of the present disclosure, for the PUCCH, the TPC field is a TPC field in one of the downlink control channel with the downlink DCI format for scheduling the PDSCH and the downlink control channel indicating the downlink SPS resource release except the downlink control channel in which the TPC field is reused for indicating an ACK/NACK resource.

In yet another aspect, the present disclosure provides in some embodiments an apparatus for controlling uplink transmission power, including a processor, and a transceiver connected to the processor and configured to receive and transmit data under the control of the processor. The processor is configured to: receive configuration information, and determine a PC parameter corresponding to a TTI length of a first type and a PC parameter corresponding to a TTI length of a second type in accordance with the configuration information; and determine transmission power of a channel which is transmitted using the TTI length of the first type in accordance with the PC parameter corresponding to the TTI length of the first type, and determine transmission power of a channel which is transmitted using the TTI length of the second type in accordance with the PC parameter corresponding to the TTI length of the second type.

In still yet another aspect, the present disclosure provides in some embodiments a non-transistory computer storage medium storing therein a computer-readable instruction capable of being executed by a processor. The processor is configured to execute the computer-readable instruction, so as to: receive configuration information, and determine a PC parameter corresponding to a TTI length of a first type and a PC parameter corresponding to a TTI length of a second type in accordance with the configuration information; and determine transmission power of a channel which is transmitted using the TTI length of the first type in accordance with the PC parameter corresponding to the TTI length of the first type, and determine transmission power of a channel which is transmitted using the TTI length of the second type in accordance with the PC parameter corresponding to the TTI length of the second type.

The present disclosure has the following advantages or beneficial effects. The UE may determine the transmission power for the channel which is transmitted using the TTI length of the first type in accordance with the PC parameter corresponding to the TTI length of the first type, and determine the transmission power for the channel which is transmitted using the TTI length of the second type in accordance with the PC parameter corresponding to the TTI length of the second type. As a result, it is able to configure a separate PC parameter with respect to each of the TTI length of the first type and the TTI length of the second type, thereby to improve the channel estimation accuracy and ensure the reliable data transmission.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure. In contrast, these embodiments are provided so as to facilitate the understanding of the present disclosure.

It should be appreciated that, the present disclosure may be provided as a system, a device, an apparatus, a method or a computer program product, so the present disclosure may be in the form of hardware, software (including firmware, resident software or microcode), or combinations thereof.

It should be further appreciated that, such words as "first" and "second" used in the specification, claims and the drawings are merely used to differentiate different components rather than to represent any order, number or importance. These words may be replaced with each other if appropriate, so as to implement the embodiments of the present disclosure in an order other than that shown in the drawings or described in the context. In addition, such terms as "include" or "including" or any other variations involved in the present disclosure intend to provide non-exclusive coverage, so that a procedure, method, article or device including a series of steps or elements may also include any other steps or elements not listed herein, or may include any inherent steps or elements of the procedure, method, article or device.

It should be further appreciated that, in the case of no conflict, the embodiments or the features in the embodiments may be combined in any form. The present disclosure will be described hereinafter in conjunction with the drawings and embodiments.

Figure 2:
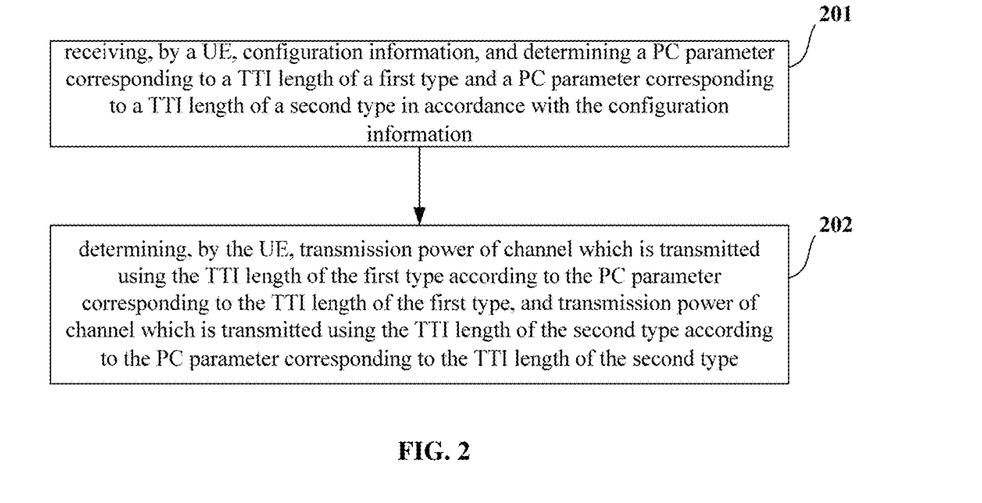
FIG. 2 is a flow chart of a method for controlling uplink transmission power according to some embodiments of the present disclosure.

As shown in FIG. 2, the present disclosure provides in some embodiments a method for controlling uplink transmission power, which includes the following steps.

Step 201: receiving, by a UE, configuration information, determining a PC parameter corresponding to a TTI length of a first type and a PC parameter corresponding to a TTI length of a second type in accordance with the configuration information, and then proceeding to Step 202.

It should be appreciated that, the TTI length of the first type may be a TTI length of one subframe, e.g., 1 ms, and the TTI length of the second type may be a TTI length shorter than the TTI length of one subframe, e.g., 0.5 ms. Also, the TTI length of the first type may be a short TTI length, e.g., 0.5 ms, and the TTI length of the second type may be a normal TTI length, e.g., 1 ms. In addition, the TTI length of the first type may be a short TTI length of a first type, and the TTI length of the second type may be a short TTI length of a second type.

Step 202: determining, by the UE, transmission power of a channel which is transmitted using the TTI length of the first type in accordance with the PC parameter corresponding to the TTI length of the first type, and transmission power of a channel which is transmitted using the TTI length of the second type in accordance with the PC parameter corresponding to the TTI length of the second type.

In some possible embodiments of the present disclosure, for an open-loop parameter, in Step 201, the UE may receive RRC signaling or broadcast signaling, acquire at least one of a path loss compensation factor and a first power offset value corresponding to the TTI length of the first type, and acquire at least one of a path loss compensation factor and a second power offset value corresponding to the TTI length of the second type.

In some possible embodiments of the present disclosure, for the open-loop parameter, when a TPC accumulation mode is adopted, for a PUSCH, the UE may receive a downlink control channel with an uplink DCI format for scheduling the PUSCH, and take a sum of a power adjustment value indicated by a TPC field in the downlink control channel and a power adjustment value corresponding to a previous PUSCH, which is transmitted using the same type of TTI length as the PUSCH, as a power adjustment value for the PUSCH.

In other words, when a TTI length for the PUSCH scheduled by the downlink control channel is the TTI length of the first type, the UE may take a sum of the power adjustment value indicated by the TPC field in the downlink control channel and a power adjustment value corresponding to a previous PUSCH which is transmitted using the TTI length of the first type as the power adjustment value for the PUSCH, and when the TTI length for the PUSCH scheduled by the downlink control channel is the TTI length of the second type, the UE may take a sum of the power adjustment value indicated by the TPC field in the downlink control channel and a power adjustment value corresponding to a previous PUSCH which is transmitted using the TTI length of the second type as the power adjustment value for the PUSCH.

For a PUCCH, the description will be given as follows.

Mode 1: Differentiating the TTI Lengths for Downlink Data

The UE may receive a downlink control channel with a downlink DCI format for scheduling a PDSCH or a downlink control channel indicating downlink SPS resource release, and ACK/NACK feedback information of the PDSCH or the downlink control channel indicating the downlink SPS resource release may be transmitted in a target PUCCH. Then, the UE may take a sum of a power adjustment value indicated by a TPC field in the downlink control channel and a power adjustment value corresponding to a previous PUCCH carrying the ACK/NACK feedback information of the PDSCH or the downlink control channel indicating the downlink SPS resource release, which is transmitted using the same type of TTI length, as the power adjustment value for the PUCCH.

In other words, when a TTI length for the PDSCH or the downlink control channel indicating the downlink SPS resource release is the TTI length of the first type, the UE may take a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of the PDSCH or the downlink control channel indicating the downlink SPS resource release, which is transmitted using the TTI length of the first type, as the power adjustment value for the PUCCH. When the TTI length for the PDSCH or the downlink control channel indicating the downlink SPS resource release is the TTI length of the second type, the UE may take a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of the PDSCH or the downlink control channel indicating the downlink SPS resource release, which is transmitted using the TTI length of the second type, as the power adjustment value for the PUSCH.

Mode 2: Differentiating the TTI Lengths for the PUCCH

The UE may receive a downlink control channel with a downlink DCI format for scheduling a PDSCH or a downlink control channel indicating downlink SPS resource release, and the PDSCH or the downlink control channel indicating the downlink SPS resource release may perform ACK/NACK feedback in a target PUCCH. Then, the UE may take a sum of a power adjustment value indicated by a TPC field in the downlink control channel and a power adjustment value corresponding to a previous PUCCH, which is transmitted using the same type TTI length as the PUCCH, as a power adjustment value for the PUCCH.

In other words, when a TTI length for the PUCCH is the TTI length of the first type, the UE may take a sum of the power adjustment value indicated by the TPC field in the downlink control channel and a power adjustment value corresponding to a previous PUCCH which is transmitted using the TTI length of the first type as a power adjustment value for the PUCCH. When the TTI length for the PUCCH is the TTI length of the second type, the UE may take a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the second type as the power adjustment value for the PUSCH.

In some possible embodiments of the present disclosure, the TTI length for the PUCCH is notified in the downlink control channel, or through configuration signaling, or in accordance with a pre-agreed rule.

It should be appreciated that, the downlink control channel may be a channel transmitted using a TTI length of 1 ms or shorter than 1 ms. When the channel is transmitted using the TTI length shorter than 1 ms, the PUCCH is an sPUCCH, the PUSCH is an sPUSCH, and the PDSCH is an sPDSCH.

It should be appreciated that, for the PUCCH, the TPC field may be a TPC field in one of the downlink control channel with the downlink DCI format for scheduling the PDSCH and the downlink control channel indicating the downlink SPS resource release except the downlink control channel in which the TPC field is reused for indicating an ACK/NACK resource.

It should be further appreciated that, for different types of TTI lengths, the power adjustment values corresponding to the TPC commands may reuse definitions in LTE Rel-8/9/10, or for the short TTI, a new correspondence between the TPC commands and the power adjustment values may be defined.

According to the embodiments of the present disclosure, the UE may determine the transmission power for the channel which is transmitted using the TTI length of the first type in accordance with the PC parameter corresponding to the TTI length of the first type, and determine the transmission power for the channel which is transmitted using the TTI length of the second type in accordance with the PC parameter corresponding to the TTI length of the second type. As a result, it is able to configure the separate PC parameter for each of the TTI length of the first type and the TTI length of the second type, thereby to improve the channel estimation accuracy and ensure the reliable data transmission.

In the embodiments of the present disclosure, the separate configuration of the PC parameter includes the separate configuration of a cell-specific parameter in the open-loop parameters, the separate configuration of a UE-specific parameter in the open-loop parameters, and the separate configuration of a closed-loop modification coefficient, which will be described hereinafter.

1) Separate Configuration of the Cell-Specific Parameter in the Open-Loop Parameters In some possible embodiments of the present disclosure, the channel may be the PUSCH, and the TTI lengths in a system may be 1 ms and 0.5 ms, i.e., a normal TTI and a slot-based sTTI. For the cell-specific parameters, at least one of $P_{O\_NOMINAL\_PUSCH}(j)$, a path loss compensation factor $\alpha(j)$ and $K_S$ may be differentiated, where $K_S$ represents a cell-specific parameter configured through the RRC signaling and it corresponds to a current transmission format. Taking $P_{O\_NOMINAL\_PUSCH}(j)$ as an example, it may include $P_{O\_normalTTI\_NOMINAL\_PUSCH}(j)$ and $P_{O\_sTTI\_NOMINAL\_PUSCH}(j)$, which may be broadcast to all UEs residing in a cell through System Information Block (SIB) information. Each UE may receive the broadcast signaling, acquire the PC parameters for the normal TTI and the slot-based sTTI. At this time, the transmission power may be calculated through the following formula:

$$P_{PUSCH}(i) = \min\left\{\begin{array}{l}P_{MAX}(i), \\ 10\log_{10}(M_{PUSCH}(i)) + P_{O\_PUSCH}(j) + \\ \alpha(j) \cdot PL + \Delta_{TF}(i) + f(i)\end{array}\right\}[dBm],$$

where for the normal TTI, $P_{O\_PUSCH}(j) = P_{O\_normal\_TTI\_NOMINAL\_PUSCH}(j) + P_{O\_UE\_PUSCH}(j)$ and for the sTTI, $P_{O\_PUSCH}(j) = P_{O\_sTTI\_NOMINAL\_PUSCH}(j) + P_{O\_UE\_PUSCH}(j)$.

In other possible embodiments of the present disclosure, the channel may be the PUCCH, and the TTI lengths in the system may be 1 ms and 0.5 ms, i.e., a normal TTI and a slot-based sTTI. For the cell-specific parameters, at least one of $P_{O\_NOMINAL\_PUCCH}(j)$ and $\Delta_{F\_PUCCH}$ (F) may be differentiated. Taking $P_{O\_NOMINAL\_PUCCH}(j)$ as an example, it may include $P_{O\_normal\_TTI\_NOMINAL\_PUCCH}$ and $P_{O\_sTTI\_NOMINAL\_PUCCH}(j)$, which may be broadcast to all UEs residing in the cell through the SIB information. Each UE may receive the broadcast signaling, acquire the PC parameters for the normal TTI and the slot-based sTTI. At this time, the transmission power may be calculated through the following formula:

$$P_{PUCCH}(i) = \min\left\{\begin{array}{l}P_{MAX}(i), \\ P_{0\_PUCCH} + PL + h(n_{CQI}, n_{HARQ}, n_{SR}) + \\ \Delta_{F\_PUCCH}(F) + \Delta_{TxD}(F') + g(i)\end{array}\right\}[dBm],$$

where for the normal TTI, $P_{O\_PUCCH}(j) = P_{O\_normal\_TTI\_NOMINAL\_PUCCH}(j) + P_{O\_UE\_PUCCH}(j)$, and for the slot-based sTTI, $P_{O\_PUCCH}(j) = P_{O\_sTTI\_NOMINAL\_PUCCH}(j) + P_{O\_UE\_PUCCH}(j)$.

2) Separate Configuration of the UE-Specific Parameter in the Open-Loop Parameters In some possible embodiments of the present disclosure, the channel may be the PUSCH, and the TTI lengths in a system may be 1 ms and 0.5 ms, i.e., a normal TTI and a slot-based sTTI. A UE-specific parameter $P_{O\_PUSCH}$ may be configured, and a UE-specific parameter $P_{O\_UE\_PUSCH}(j)$ may include $P_{O\_normal\_TTI\_UE\_PUSCH}(j)$ and $P_{O\_sTTI\_UE\_PUSCH}(j)$, which may be transmitted to the UE through the RRC signaling. The UE may receive the RRC signaling, acquire the PC parameters for the normal TTI and the slot-based sTTI. When the channel is the PUSCH, the transmission power may be calculated through the following formula:

$$P_{PUSCH}(i) = \min\left\{\begin{array}{l}P_{MAX}(i), \\ 10\log_{10}(M_{PUSCH}(i)) + P_{O\_PUSCH}(j) + \\ \alpha(j) \cdot PL + \Delta_{TF}(i) + f(i)\end{array}\right\}[dBm],$$

where for the normal TTI, $P_{O\_PUSCH}(j)$ $P_{O\_NOMINAL\_PUSCH}(j) + P_{O\_normalTTI\_UE\_PUSCH}(j)$, and for the sTTI, $P_{O\_PUSCH}(j) = P_{O\_NOMINAL\_PUSCH}(j) + P_{O\_sTTI\_UE\_PUSCH}(j)$.

In other possible embodiments of the present disclosure, the channel may be the PUCCH, and the TTI lengths in a system may be 1 ms and 0.5 ms, i.e., a normal TTI and a slot-based sTTI. A UE-specific parameter $P_{O\_PUSCH}(j)$ may be configured, and at least one of UE-specific parameters $P_{O\_UE\_PUCCH}(j)$ and $\Delta_{TxD}(F')$ may be differentiated. Taking $P_{O\_UE\_PUCCH}$ as an example, it may include $P_{O\_normalTTI\_UE\_PUCCH}(j)$ and $P_{O\_sTTI\_UE\_PUCCH}(j)$, which may be transmitted to the UE through the RRC signaling. The UE may receive the RRC signaling, acquire the PC parameters for the normal TTI and the slot-based sTTI. When the channel is the PUSCH, the transmission power may be calculated through the following formula:

$$P_{PUCCH}(i) = \min\left\{\begin{array}{l}P_{MAX}(i), \\ P_{0\_PUCCH} + PL + h(n_{CQI}, n_{HARQ}, n_{SR}) + \\ \Delta_{F\_PUCCH}(F) + \Delta_{TxD}(F') + g(i)\end{array}\right\}[dBm],$$

where for the normal TTI, $P_{O\_PUCCH}(j) = P_{O\_normal\_TTI\_NOMINAL\_PUCCH}(j) + P_{O\_UE\_PUCCH}(j)$, and for the sTTI, $P_{O\_PUCCH}(j) = P_{O\_sTTI\_NOMINAL\_PUCCH}(j) + P_{O\_UE\_PUCCH}(j)$.

3) Separate Configuration of the Closed-Loop Modification Coefficient

The channel may be the PUSCH, and the TTI lengths in the system may be 1 ms and 0.5 ms, i.e., a normal TTI and a slot-based sTTI. With respect to different TTI lengths, the closed-loop modification coefficient may include $\delta_{normalTTI\_PUSCH}$ and $\delta_{sTTI\_PUSCH}$.

A base station may transmit a downlink control channel 1 for scheduling the transmission of PUSCH1 in the normal TTI within a subframe i, and $\delta_{normalTTI\_PUSCH}$ may be indicated by the TPC field of the downlink control channel 1. The base station may transmit a downlink control channel 2 for scheduling the transmission of PUSCH2 in the slot-based sTTI within a subframe j, and $\delta_{sTTI\_PUSCH}$ may be indicated by the TPC field of the downlink control channel 2.

At a UE side, the UE may receive the downlink control channel 1, determine that the TTI length for the PUSCH1 scheduled by the downlink control channel 1 is a normal TTI length, acquire a value of $\delta_{normalTTI\_PUSCH}$ in accordance with the TPC field of the downlink control channel 1, add the value to a power adjustment value acquired in accordance with the TPC field and corresponding to a previous PUSCH transmitted using the normal TTI, i.e., $f_{normalTTI}(i) = f_{normalTTI}(i-1) + \delta_{normalTTI\_PUSCH}(i-K_{PUSCH})$, and then determine the transmission power of the PUSCH1 through the following formula:

$$P_{PUSCH}(i) = \min\left\{\begin{array}{l}P_{MAX}(i), \\ 10\log_{10}(M_{PUSCH}(i)) + P_{O\_PUSCH}(j) + \\ \alpha(j) \cdot PL + \Delta_{TF}(i) + f(i)\end{array}\right\}[dBm].$$

In addition, the UE may receive the downlink control channel 2, determine that the TTI length for the PUSCH2 scheduled by the downlink control channel 2 is a slot-based sTTI length, acquire a value of $\delta_{sTTI\_PUSCH}$ in accordance with the TPC field of the downlink control channel 2, add the value to a power adjustment value acquired in accordance with the TPC field and corresponding to a previous PUSCH transmitted using the slot-based sTTI, i.e., $f_{sTTI} = f_{sTTI}(i-1) + \delta_{sTTI\_PUSCH}(i-K_{PUSCH})$, and then determine the transmission power of the PUSCHs through the above formula. In other words, for the PUSCH1 and PUSCH2, different values of f(i−1), i.e., different values acquired after the adding operations with respect to different TTI lengths, are provided during the calculation of f(i).

The channel may be the PUCCH, and the TTI lengths in the system may be 1 ms and 0.5 ms, i.e., a normal TTI and a slot-based sTTI. With respect to different TTI lengths, the closed-loop modification coefficient may include $\delta_{normalTTI\_PUCCH}$ and $\delta_{sTTI\_PUCCH}$.

The base station may transmit the downlink control channel 1 for scheduling the transmission of PDSCH1 in the normal TTI within the subframe i or for indicating the downlink SPS resource release, and $\delta_{normalTTI\_PUCCH}$ may be indicated by the TPC field of the downlink control channel 1. The base station may transmit the downlink control channel 2 for scheduling the transmission of PDSCH2 in the slot-based sTTI within the subframe j or for indicating the downlink SPS resource release, and $\delta_{sTTI\_PUCCH}$ may be indicated by the TPC field of the downlink control channel 2.

Mode 1

At the UE side, the UE may receive the downlink control channel 1, determine that the TTI length for the PDSCH1 scheduled by the downlink control channel 1 or the downlink control channel indicating the downlink SPS resource release is the normal TTI length, determine that the ACK/NACK feedback information of the PDSCH1 or the downlink control channel indicating the downlink SPS resource release is transmitted in the PUCCH1, acquire a value of $\delta_{normalTTI\_PUCCH}$ in accordance with the TPC field of the downlink control channel 1, add the value to a power adjustment value acquired in accordance with the TPC field and corresponding to a previous PUCCH carrying the ACK/NACK feedback information corresponding to the PDSCH or the downlink control channel indicating the downlink SPS resource release which is transmitted using the normal TTI, i.e., $f_{normalTTI}(i)=f_{normalTTI}(i-1)+\delta_{normalTTI\_PUCCH}(i-K_{PUCCH})$ and determine the transmission power for the PUCCH1 through the following formula:

$$P_{PUCCH}(i) = \min\left\{ \begin{array}{l} P_{MAX}(i), \\ P_{0\_PUCCH} + PL + h(n_{CQI}, n_{HARQ}, n_{SR}) + \\ \Delta_{F\_PUCCH}(F) + \Delta_{TxD}(F') + g(i) \end{array} \right\} [dBm].$$

In addition, the UE may receive the downlink control channel 2, determine that the TTI length for the PDSCH2 scheduled by the downlink control channel 2 or the downlink control channel indicating the downlink SPS resource release is the slot-based sTTI length, determine that the ACK/NACK feedback information of the PDSCH1 or the downlink control channel indicating the downlink SPS resource release is transmitted in the PUCCH2, acquire a value of $\delta_{sTTI\_PUCCH}$ in accordance with the TPC field of the downlink control channel 2, add the value to a power adjustment value acquired in accordance with the TPC field and corresponding to a previous PUCCH carrying the ACK/NACK feedback information corresponding to the PDSCH or the downlink control channel indicating the downlink SPS resource release which is transmitted using the slot-based sTTI, i.e., $f_{sTTI}(i)=f_{sTTI}(i-1)+\delta_{sTTI\_PUCCH}(i-K_{PUCCH})$, and determine the transmission power for the PUCCH2 through the above formula. In other words, for the PUCCH1 and PUCCH2, different values of f(i-1), i.e., different values acquired after the adding operations with respect to different TTI lengths, are provided during the calculation of f(i).

Mode 2

At the UE side, the UE may receive the downlink control channel 1, determine that the TTI length for the PUCCH1 carrying the ACK/NACK feedback information of the PDSCH1 scheduled by the downlink control channel 1 or the downlink control channel indicating the downlink SPS resource release is the normal TTI length, acquire a value of $\delta_{normalTTI\_PUCCH}$ in accordance with the TPC field of the downlink control channel 1, add the value to a power adjustment value acquired in accordance with the TPC field and corresponding to a previous PUCCH transmitted using the normal TTI, i.e., $f_{normalTTI}(i)=f_{normalTTI}(i-1)+\delta_{normalTTI\_PUCCH}(i-K_{PUCCH})$ and determine the transmission power for the PUCCH1 through the following formula $$P_{PUCCH}(i) = \min\left\{ \begin{array}{l} P_{MAX}(i), \\ P_{0\_PUCCH} + PL + h(n_{CQI}, n_{HARQ}, n_{SR}) + \\ \Delta_{F\_PUCCH}(F) + \Delta_{TxD}(F') + g(i) \end{array} \right\} [dBm].$$

In addition, the UE may receive the downlink control channel 2, determine that the TTI length for the PUCCH2 carrying the ACK/NACK feedback information of the PDSCH2 scheduled by the downlink control channel 2 or the downlink control channel indicating the downlink SPS resource release is the slot-based sTTI length, acquire a value of $\delta_{sTTI\_PUCCH}$ in accordance with the TPC field of the downlink control channel 2, add the value to a power adjustment value acquired in accordance with the TPC field and corresponding to a previous PUCCH transmitted using the slot-based sTTI, i.e., $f_{sTTI}(i)=f_{sTTI}(i-1)+\delta_{sTTI\_PUCCH}(i-K_{PUCCH})$, and determine the transmission power for the PUCCH2 through the above formula. In other words, for the PUCCH1 and PUCCH2, different values of f(i-1), i.e., different values acquired after the adding operations with respect to different TTI lengths, are provided during the calculation of f(i).

Figure 3:
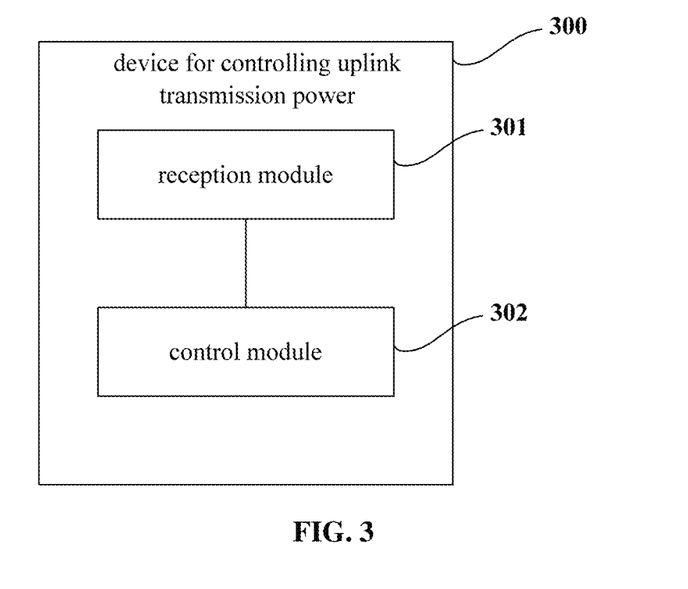
FIG. 3 is a block diagram of a device for controlling uplink transmission power according to some embodiments of the present disclosure.

As shown in FIG. 3, the present disclosure further provides in some embodiments a device 300 for controlling uplink transmission power, including: a reception module 301 configured to receive configuration information, and determine a PC parameter corresponding to a TTI length of a first type and a PC parameter corresponding to a TTI length of a second type in accordance with the configuration information; and a control module 302 configured to determine transmission power of a channel which is transmitted using the TTI length of the first type in accordance with the PC parameter corresponding to the TTI length of the first type, and determine transmission power of a channel which is transmitted using the TTI length of the second type in accordance with the PC parameter corresponding to the TTI length of the second type.

In some possible embodiments of the present disclosure, the TTI length of the first type may be a TTI length of one subframe, and the TTI length of the second type may be a TTI length shorter than the TTI length of one subframe; or the TTI length of the first type may be a short TTI length, and the TTI length of the second type may be a normal TTI length; or the TTI length of the first type may be a short TTI length of a first type, and the TTI length of the second type may be a short TTI length of a second type. In other words, merely the normal TTI length and the sTTI length may be differentiated from each other, or the sTTI lengths may be further differentiated from each other, e.g., the sTTI length of the first type and the sTTI length of the second type may be configured separately.

In some possible embodiments of the present disclosure, the reception module is further configured to receive RRC signaling or broadcast signaling, acquire at least one of a path loss compensation factor and a first power offset value corresponding to the TTI length of the first type, and acquire at least one of a path loss compensation factor and a second power offset value corresponding to the TTI length of the second type. The first power offset value and the second power offset value may each include a UE-specific parameter and/or a cell-specific parameter.

In some possible embodiments of the present disclosure, a TPC accumulation mode is enabled for a PUSCH. The control module is further configured to: receive a downlink control channel with an uplink DCI format for scheduling the PUSCH, and when a TTI length for the PUSCH scheduled by the downlink control channel is the TTI length of the first type, take a sum of a power adjustment value indicated by a TPC field in the downlink control channel and a power adjustment value corresponding to a previous PUSCH which is transmitted using the TTI length of the first type as a power adjustment value for the PUSCH; and when the TTI length for the PUSCH scheduled by the downlink control channel is the TTI length of the second type, take a sum of the power adjustment value indicated by the TPC field in the downlink control channel and a power adjustment value corresponding to a previous PUSCH which is transmitted using the TTI length of the second type as the power adjustment value for the PUSCH.

In some possible embodiments of the present disclosure, the control module is further configured to: receive a downlink control channel with a downlink DCI format for scheduling a PDSCH or a downlink control channel indicating downlink SPS resource release, ACK/NACK feedback information of the PDSCH or the downlink control channel indicating the downlink SPS resource release being transmitted in a target PUCCH; when a TTI length for the PDSCH or the downlink control channel indicating the downlink SPS resource release is the TTI length of the first type, take a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of the PDSCH or the downlink control channel indicating the downlink SPS resource release, which is transmitted using the TTI length of the first type, as the power adjustment value for the PUCCH; and when the TTI length for the PDSCH or the downlink control channel indicating the downlink SPS resource release is the TTI length of the second type, take a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of the PDSCH or the downlink control channel indicating the downlink SPS resource release, which is transmitted using the TTI length of the second type, as the power adjustment value for the PUSCH.

In some possible embodiments of the present disclosure, the control module is further configured to: receive a downlink control channel with a downlink DCI format for scheduling a PDSCH or a downlink control channel indicating downlink SPS resource release, the PDSCH or the downlink control channel indicating the downlink SPS resource release performing ACK/NACK feedback in a target PUCCH, the target PUCCH being adopted to represent that the received PDSCH or the received PDCCH indicating the SPS resource release performs the ACK/NACK feedback in a same PUCCH whose power needs to be determined; when a TTI length for the PUCCH is the TTI length of the first type, take a sum of a power adjustment value indicated by a TPC field in the downlink control channel and a power adjustment value corresponding to a previous PUCCH which is transmitted using the TTI length of the first type as a power adjustment value for the PUCCH; and when the TTI length for the PUCCH is the TTI length of the second type, take a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the second type as the power adjustment value for the PUCCH.

In some possible embodiments of the present disclosure, the TTI length for the PUCCH is notified in the downlink control channel, or through configuration signaling, or in accordance with a pre-agreed rule.

In some possible embodiments of the present disclosure, for the PUCCH, the TPC field is a TPC field in one of the downlink control channel with the downlink DCI format for scheduling the PDSCH and the downlink control channel indicating the downlink SPS resource release except the downlink control channel in which the TPC field is reused for indicating an ACK/NACK resource.

According to the embodiments of the present disclosure, the UE may determine the transmission power for the channel which is transmitted using the TTI length of the first type in accordance with the PC parameter corresponding to the TTI length of the first type, and determine the transmission power for the channel which is transmitted using the TTI length of the second type in accordance with the PC parameter corresponding to the TTI length of the second type. As a result, it is able to configure a separate PC parameter with respect to each of the TTI length of the first type and the TTI length of the second type, thereby to improve the channel estimation accuracy and ensure the reliable data transmission.

Figure 4:
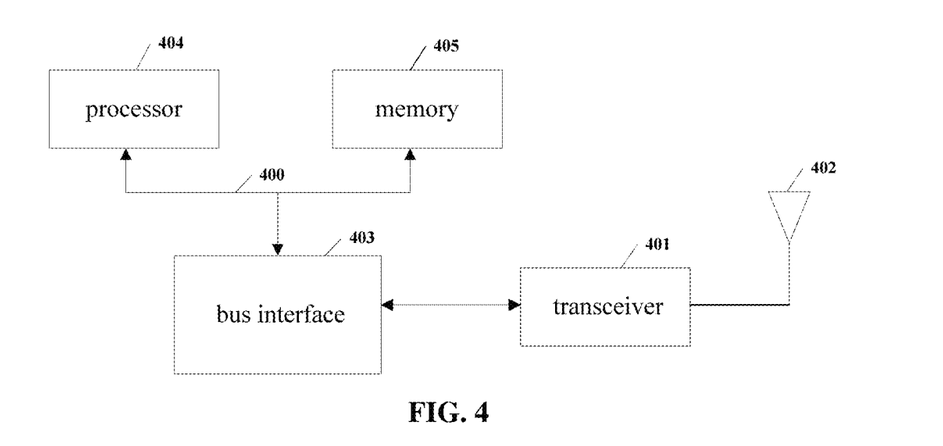
FIG. 4 is a block diagram of an apparatus for controlling uplink transmission power according to some embodiments of the present disclosure.

As shown in FIG. 4, the present disclosure further provides in some embodiments an apparatus for controlling uplink transmission power, including: a processor 404 configured to read a program stored in a memory 405, so as to: receive configuration information, determine a PC parameter corresponding to a TTI length of a first type and a PC parameter corresponding to a TTI length of a second type in accordance with the configuration information, determine transmission power of a channel which is transmitted using the TTI length of the first type in accordance with the PC parameter corresponding to the TTI length of the first type, and determine transmission power of a channel which is transmitted using the TTI length of the second type in accordance with the PC parameter corresponding to the TTI length of the second type; and a transceiver 401 configured to receive and transmit data under the control of the processor 404.

In FIG. 4, bus architecture 400 may include a number of buses and bridges connected to each other, so as to connect various circuits for one or more processors 404 and one or more memories 405. In addition, as is known in the art, the bus architecture 400 may be used to connect any other circuits, such as a circuit for a peripheral device, a circuit for a voltage stabilizer and a power management circuit. A bus interface 403 is provided between the bus architecture 400 and the transceiver 401, and the transceiver 401 may consist of one or more elements, i.e., a plurality of transmitters and a plurality of receivers for communication with any other devices over a transmission medium. Data from the processor 404 may be transmitted over a wireless medium through an antenna 402. The antenna 402 may be further configured to receive data and transmit the data to the processor 404. The processor 404 may take charge of managing the bus architecture as well as general processings, and may further provide various functions such as timing, peripheral interfacing, voltage adjustment, power source management and any other control functions. The memory 405 may store therein data desired for the operation of the processor 404.

In some possible embodiments of the present disclosure, the processor 404 may be a Central Processing Unit (CPU), an Application Specific Integrated Circuit (ASIC), a Field-Programmable Gate Array (FPGA) or a Complex Programmable Logic Device (CPLD).

In some possible embodiments of the present disclosure, the TTI length of the first type may be a TTI length of one subframe, and the TTI length of the second type may be a TTI length shorter than the TTI length of one subframe; or the TTI length of the first type may be a short TTI length, and the TTI length of the second type may be a normal TTI length; or the TTI length of the first type may be a short TTI length of a first type, and the TTI length of the second type may be a short TTI length of a second type.

In some possible embodiments of the present disclosure, the processor 404 is further configured to receive RRC signaling or broadcast signaling, acquire at least one of a path loss compensation factor and a first power offset value corresponding to the TTI length of the first type, and acquire at least one of a path loss compensation factor and a second power offset value corresponding to the TTI length of the second type.

In some possible embodiments of the present disclosure, a TPC accumulation mode is enabled for a PUSCH. The processor 404 is further configured to: receive a downlink control channel with an uplink DCI format for scheduling the PUSCH, and when a TTI length for the PUSCH scheduled by the downlink control channel is the TTI length of the first type, take a sum of a power adjustment value indicated by a TPC field in the downlink control channel and a power adjustment value corresponding to a previous PUSCH which is transmitted using the TTI length of the first type as a power adjustment value for the PUSCH; and when the TTI length for the PUSCH scheduled by the downlink control channel is the TTI length of the second type, take a sum of the power adjustment value indicated by the TPC field in the downlink control channel and a power adjustment value corresponding to a previous PUSCH which is transmitted using the TTI length of the second type as the power adjustment value for the PUSCH.

In some possible embodiments of the present disclosure, the processor 404 is further configured to receive a downlink control channel with a downlink DCI format for scheduling a PDSCH or a downlink control channel indicating downlink SPS resource release, ACK/NACK feedback information of the PDSCH or the downlink control channel indicating the downlink SPS resource release being transmitted in a target PUCCH; when a TTI length for the PDSCH or the downlink control channel indicating the downlink SPS resource release is the TTI length of the first type, take a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of the PDSCH or the downlink control channel indicating the downlink SPS resource release, which is transmitted using the TTI length of the first type, as the power adjustment value for the PUCCH; and when the TTI length for the PDSCH or the downlink control channel indicating the downlink SPS resource release is the TTI length of the second type, take a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of the PDSCH or in the downlink control channel indicating the downlink SPS resource release, which is transmitted using the TTI length of the second type, as the power adjustment value for the PUSCH.

In some possible embodiments of the present disclosure, the control module is further configured to: receive a downlink control channel with a downlink DCI format for scheduling a PDSCH or a downlink control channel indicating downlink SPS resource release, the PDSCH or the downlink control channel indicating the downlink SPS resource release performing ACK/NACK feedback in a target PUCCH; when a TTI length for the PUCCH is the TTI length of the first type, take a sum of a power adjustment value indicated by a TPC field in the downlink control channel and a power adjustment value corresponding to a previous PUCCH which is transmitted using the TTI length of the first type as a power adjustment value for the PUCCH; and when the TTI length for the PUCCH is the TTI length of the second type, take a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the second type as the power adjustment value for the PUSCH.

In some possible embodiments of the present disclosure, the TTI length for the PUCCH is notified in the downlink control channel, or through configuration signaling, or in accordance with a pre-agreed rule.

In some possible embodiments of the present disclosure, for the PUCCH, the TPC field is a TPC field in one of the downlink control channel with the downlink DCI format for scheduling the PDSCH and the downlink control channel indicating the downlink SPS resource release except the downlink control channel in which the TPC field is reused for indicating an ACK/NACK resource.

According to the embodiments of the present disclosure, the UE may determine the transmission power for the channel which is transmitted using the TTI length of the first type in accordance with the PC parameter corresponding to the TTI length of the first type, and determine the transmission power for the channel which is transmitted using the TTI length of the second type in accordance with the PC parameter corresponding to the TTI length of the second type. As a result, it is able to configure a separate PC parameter with respect to each of the TTI length of the first type and the TTI length of the second type, thereby to improve the channel estimation accuracy and ensure the reliable data transmission.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the above steps do not refer to an order of the steps, and the order of the steps shall be determined in accordance with the functions and internal logic thereof, i.e., the serial numbers of the steps shall not be construed as limiting the scope of the present disclosure.

In addition, the terms "system" and "network" may be replaced with each other. The expression "and/or" is merely used to describe the relationship between objects, and it includes three relationships. For example, "A and/or B" may represent that, there is only A, there are both A and B, and there is only B. Further, the symbol "/" usually refers to "or".

It should be further appreciated that, the expression "B corresponding to A" means that B is associated with A and may be determined in accordance with A. However, when B is determined in accordance with A, it means that B may be determined in accordance with A and/or any other information.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for controlling uplink transmission power, comprising:

receiving, by a User Equipment (UE), configuration information, and determining a power control (PC) parameter corresponding to a Transmission Time Interval (TTI) length of a first type and a PC parameter corresponding to a TTI length of a second type in accordance with the configuration information; and determining, by the UE, transmission power of a channel which is transmitted using the TTI length of the first type in accordance with the PC parameter corresponding to the TTI length of the first type, and transmission power of a channel which is transmitted using the TTI length of the second type in accordance with the PC parameter corresponding to the TTI length of the second type, wherein the receiving, by the UE, the configuration information, and determining the PC parameter corresponding to the TTI length of the first type and the PC parameter corresponding to the TTI length of the second type in accordance with the configuration information comprises one of, receiving, by the UE, Radio Resource Control (RRC) signaling or broadcast signaling, acquiring at least one of a path loss compensation factor and a first power offset value corresponding to the TTI length of the first type, and acquiring at least one of a path loss compensation factor and a second power offset value corresponding to the TTI length of the second type, or receiving, by the UE, a downlink control channel with a downlink Downlink Control information (DCI) format for scheduling a Physical Downlink Shared Channel (PDSCH) or a downlink control channel indicating downlink Semi-Persistent Scheduling (SPS) resource release, Acknowledgement/Non-Acknowledgement (ACK/NACK) feedback information of the PDSCH or the downlink control channel indicating the downlink SPS resource release being transmitted in a target PUCCH, and when a TTI length for the PDSCH or the downlink control channel indicating the downlink SPS resource release is the TTI length of the first type, taking, by the UE, a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using TTI length of the first type or a downlink control channel indicating the downlink SPS resource release transmitted using the TTI length of the first type, as a power adjustment value for the PUCCH; and when the TTI length for the PDSCH or the downlink control channel indicating the downlink SPS resource release is the TTI length of the second type, taking, by the UE, a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using the TTI length of the second type or a downlink control channel indicating the downlink SPS resource release transmitted using TTI length of the second type, as the power adjustment value for the PUSCH, or receiving, by the UE, a downlink control channel with a downlink DCI format for scheduling a PDSCH or a downlink control channel indicating downlink SPS resource release, the PDSCH or the downlink control channel indicating the downlink SPS resource release performing ACK/NACK feedback in a target PUCCH; when a TTI length for the PUCCH is the TTI length of the first type, taking a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the first type as a power adjustment value for the PUCCH; and when the TTI length for the PUCCH is the TTI length of the second type, taking a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the second type as the power adjustment value for the PUSCH.

2. The method according to claim 1, wherein the TTI length of the first type is a TTI length of one subframe, and the TTI length of the second type is a TTI length shorter than the TTI length of one subframe; or the TTI length of the first type is a short TTI length, and the TM length of the second type is a normal TTI length; or the TTI length of the first type is a short TTI length of a first type, and the TTI length of the second type is a short TTI length of a second type.

3. The method according to claim 2, wherein the receiving, by the UE, the configuration information, and determining the PC parameter corresponding to the TTI length of the first type and the PC parameter corresponding to the TTI length of the second type in accordance with the configuration information comprises receiving, by the UE, Radio Resource Control (RRC) signaling or broadcast signaling, acquiring at least one of a path loss compensation factor and a first power offset value corresponding to the TTI length of the first type, and acquiring at least one of a path loss compensation factor and a second power offset value corresponding to the TTI length of the second type.

4. The method according to claim 1, wherein a Transmission Power Control (TPC) accumulation mode is enabled for a Physical Uplink Shared Control Channel (PUSCH), wherein the receiving, by the UE, the configuration information, and determining the PC parameter corresponding to the TTI length of the first type and the PC parameter corresponding to the TTI length of the second type in accordance with the configuration information comprises:

receiving, by the UE, a downlink control channel with an uplink Downlink Control information (DCI) format for scheduling the PUSCH, and when a TTI length for the PUSCH scheduled by the downlink control channel is the TTI length of the first type, taking, by the UE, a sum of a power adjustment value indicated by a TPC field in the downlink control channel and a power adjustment value corresponding to a previous PUSCH which is transmitted using the TTI length of the first type as a power adjustment value for the PUSCH; and when the TTI length for the PUSCH scheduled by the downlink control channel is the TTI length of the second type, taking, by the UE, a sum of the power adjustment value indicated by the TPC field in the downlink control channel and a power adjustment value corresponding to a previous PUSCH which is transmitted using the TTI length of the second type as the power adjustment value for the PUSCH.

5. The method according to claim 1, wherein the TTI length for the PUCCH is notified in the downlink control channel, or through configuration signaling, or in accordance with a pre-agreed rule.

6. The method according to claim 1, wherein for the PUCCH, the TPC field is a TPC field in one of the downlink control channel with the downlink DCI format for scheduling the PDSCH and the downlink control channel indicating the downlink SPS resource release except the downlink control channel in which the TPC field is reused for indicating an ACK/NACK resource.

7. An apparatus for controlling uplink transmission power, comprising a processor, and a transceiver connected to the processor and configured to receive and transmit data under the control of the processor, wherein the processor is configured to: receive configuration information, and determine a PC parameter corresponding to a TTI length of a first type and a PC parameter corresponding to a TTI length of a second type in accordance with the configuration information; and determine transmission power of a channel which is transmitted using the TTI length of the first type in accordance with the PC parameter corresponding to the TTI length of the first type, and determine transmission power of a channel which is transmitted using the TTI length of the second type in accordance with the PC parameter corresponding to the TTI length of the second type wherein the apparatus is configured to receive, the configuration information, and determine the PC parameter corresponding to the TTI length of the first type and the PC parameter corresponding to the TTI length of the second type in accordance with the configuration information by one of, receiving Radio Resource Control (RRC) signaling or broadcast signaling, acquiring at least one of a path loss compensation factor and a first power offset value corresponding to the TTI length of the first type, and acquiring at least one of a path loss compensation factor and a second power offset value corresponding to the TTI length of the second type, or receiving a downlink control channel with a downlink Downlink Control information (DCI) format for scheduling a Physical Downlink Shared Channel (PDSCH) or a downlink control channel indicating downlink Semi-Persistent Scheduling (SPS) resource release, Acknowledgement/Non-Acknowledgement (ACK/NACK) feedback information of the PDSCH or the downlink control channel indicating the downlink SPS resource release being transmitted in a target PUCCH, and when a TTI length for the PDSCH or the downlink control channel indicating the downlink SPS resource release is the TTI length of the first type, taking a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using TTI length of the first type or a downlink control channel indicating the downlink SPS resource release transmitted using the TTI length of the first type, as a power adjustment value for the PUCCH; and when the TTI length for the PDSCH or the downlink control channel indicating the downlink SPS resource release is the TTI length of the second type, taking a sum of the power adjustment value indicated by the TPC field in the downlink control channel with the downlink DCI format for scheduling the PDSCH or in the downlink control channel indicating the downlink SPS resource release and a power adjustment value corresponding to a previous PUCCH carrying the ACK/NACK feedback information of a PDSCH transmitted using the TTI length of the second type or a downlink control channel indicating the downlink SPS resource release transmitted using TTI length of the second type, as the power adjustment value for the PUSCH, or receiving a downlink control channel with a downlink DCI format for scheduling a PDSCH or a downlink control channel indicating downlink SPS resource release, the PDSCH or the downlink control channel indicating the downlink SPS resource release performing ACK/NACK feedback in a target PUCCH; when a TTI length for the PUCCH is the TTI length of the first type, taking a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the first type as a power adjustment value for the PUCCH; and when the TTI length for the PUCCH is the TTI length of the second type, taking a sum of a power adjustment value indicated by a TPC field in the downlink control channel with the downlink DCI format for scheduling the PDSCH or in the downlink control channel indicating the downlink SPS resource release and a power adjustment value corresponding to a previous PUCCH which is transmitted using the TTI length of the second type as the power adjustment value for the PUSCH.

8. The apparatus according to claim 7, wherein the TTI length of the first type is a TTI length of one subframe, and the TTI length of the second type is a TTI length shorter than the TTI length of one subframe; or the TTI length of the first type is a short TTI length, and the TTI length of the second type is a normal TTI length; or the TTI length of the first type is a short TTI length of a first type, and the TTI length of the second type is a short TTI length of a second type.

9. The apparatus according to claim 8, wherein the receiving, by the apparatus, the configuration information, and determining the PC parameter corresponding to the TTI length of the first type and the PC parameter corresponding to the TTI length of the second type in accordance with the configuration information comprises receiving, by the apparatus, Radio Resource Control (RRC) signaling or broadcast signaling, acquiring at least one of a path loss compensation factor and a first power offset value corresponding to the TTI length of the first type, and acquiring at least one of a path loss compensation factor and a second power offset value corresponding to the TTI length of the second type.

10. The apparatus according to claim 7, wherein a Transmission Power Control (TPC) accumulation mode is enabled for a Physical Uplink Shared Control Channel (PUSCH), wherein the receiving, by the apparatus, the configuration information, and determining the PC parameter corresponding to the TTI length of the first type and the PC parameter corresponding to the TTI length of the second type in accordance with the configuration information comprises:

receiving, by the apparatus, a downlink control channel with an uplink Downlink Control information (DCI) format for scheduling the PUSCH, and when a TTI length for the PUSCH scheduled by the downlink control channel is the TTI length of the first type, taking, by the apparatus, a sum of a power adjustment value indicated by a TPC field in the downlink control channel and a power adjustment value corresponding to a previous PUSCH which is transmitted using the TTI length of the first type as a power adjustment value for the PUSCH; and when the TTI length for the PUSCH scheduled by the downlink control channel is the TTI length of the second type, taking, by the apparatus, a sum of the power adjustment value indicated by the TPC field in the downlink control channel and a power adjustment value corresponding to a previous PUSCH which is transmitted using the TTI length of the second type as the power adjustment value for the PUSCH.

11. The apparatus according to claim 7, wherein the TTI length for the PUCCH is notified in the downlink control channel, or through configuration signaling, or in accordance with a pre-agreed rule.

12. The apparatus according to claim 7, wherein for the PUCCH, the TPC field is a TPC field in one of the downlink control channel with the downlink DCI format for scheduling the PDSCH and the downlink control channel indicating the downlink SPS resource release except the downlink control channel in which the TPC field is reused for indicating an ACK/NACK resource.

* * * * *